US012564118B2

(12) United States Patent
Undure et al.

(10) Patent No.: US 12,564,118 B2
(45) Date of Patent: Mar. 3, 2026

(54) DRAFT LINK FOR A THREE-POINT HITCH

(71) Applicant: DEERE & COMPANY, Moline, IL (US)

(72) Inventors: Prafull R. Undure, Ichalkarnji (IN); Sanjeev M. Hallale, Pune (IN); Ganesh T. Jadhav, Sonai (IN)

(73) Assignee: DEERE & COMPANY, Moline, IL (US)

( * ) Notice: Subject to any disclaimer, the term of this patent is extended or adjusted under 35 U.S.C. 154(b) by 427 days.

(21) Appl. No.: 18/357,423

(22) Filed: Jul. 24, 2023

(65) Prior Publication Data

US 2025/0031594 A1     Jan. 30, 2025

(51) Int. Cl.
   *A01B 59/00*     (2006.01)
   *A01B 59/06*     (2006.01)
   *B60D 1/04*     (2006.01)

(52) U.S. Cl.
   CPC .......... *A01B 59/006* (2013.01); *A01B 59/066* (2013.01); *B60D 1/04* (2013.01)

(58) Field of Classification Search
   CPC ... A01B 59/006; A01B 59/066; A01B 59/043; F16B 445/049; B60D 1/04
   USPC .................................................. 280/504, 514
   See application file for complete search history.

(56) References Cited

U.S. PATENT DOCUMENTS

| | | | |
|---|---|---|---|
| 1,198,139 A | * | 9/1916 | Lyon ..................... F16B 45/043 |
| | | | 294/82.23 |
| 2,691,932 A | | 10/1954 | Sawyer |

| | | | |
|---|---|---|---|
| 2,711,679 A | | 6/1955 | Kuhary |
| 2,844,397 A | * | 7/1958 | Wallace ............... A01B 59/004 |
| | | | 403/44 |
| 3,359,607 A | * | 12/1967 | Metz ......................... B25B 9/00 |
| | | | 24/600.8 |
| 3,361,447 A | * | 1/1968 | Engelmann .............. B60D 1/04 |
| | | | 403/321 |
| 4,023,822 A | | 5/1977 | Geisthoff et al. |
| 4,108,464 A | | 8/1978 | Von Allworden et al. |

(Continued)

FOREIGN PATENT DOCUMENTS

| | | |
|---|---|---|
| DE | 2749311 A1 | 5/1979 |
| DE | 2944452 B1 | 4/1981 |

(Continued)

OTHER PUBLICATIONS

German Search Report issued in application No. 102024116227.9 dated Feb. 11, 2025, 10 pages.

*Primary Examiner* — Joseph M Rocca
*Assistant Examiner* — Julia C Tran

(57)     ABSTRACT

A draft link for a three-point hitch includes a longitudinal component, a first attachment end, a second attachment end, and a connector positioned on the second attachment end. The connector includes a first pin positioned within a first aperture of the connector and a second pin positioned within a second aperture of the connector. A first end of the first pin extends through an inner surface of the connector. A second end of the first pin extends through an outer surface of the connector. A first end and a second end of the second pin extend through an outer surface of the connector. The first pin forms an extension of an inner surface of the connector. The second pin is in contact with the first pin maintaining the position of the first pin.

20 Claims, 7 Drawing Sheets

(56)                    References Cited

U.S. PATENT DOCUMENTS

| | | | |
|---|---|---|---|
| 4,146,246 A | | 3/1979 | Geisthoff |
| 4,147,374 A | | 4/1979 | Jeffes |
| 4,241,935 A | | 12/1980 | Norbert et al. |
| 4,418,936 A | * | 12/1983 | Adams .................... B60D 1/04 |
| | | | 244/50 |
| 4,453,622 A | * | 6/1984 | Betz .......................... B66C 1/66 |
| | | | 294/82.35 |
| 4,679,780 A | * | 7/1987 | Kloster ................ B25B 27/304 |
| | | | 403/328 |
| 5,129,667 A | * | 7/1992 | Gratton .................. B64F 1/224 |
| | | | 244/50 |
| 5,441,117 A | | 8/1995 | Fartmann et al. |
| 6,422,322 B1 | * | 7/2002 | Hoffart ............... A01B 59/006 |
| | | | 172/272 |
| 6,830,110 B2 | | 12/2004 | Schlesser et al. |
| 8,632,091 B2 | * | 1/2014 | Shaw ...................... B60D 1/02 |
| | | | 280/515 |
| 10,730,357 B2 | | 8/2020 | Heimbuch |

| | | | |
|---|---|---|---|
| 10,897,842 B2 | | 1/2021 | Bhosale et al. |
| 2005/0072582 A1 | | 4/2005 | Greenwell |
| 2006/0005977 A1 | | 1/2006 | Yamada et al. |
| 2007/0080517 A1 | * | 4/2007 | Patterson ................. B60D 1/04 |
| | | | 280/504 |
| 2009/0159303 A1 | | 6/2009 | Fox et al. |
| 2011/0221216 A1 | * | 9/2011 | Wray .................... F16B 45/026 |
| | | | 294/82.17 |
| 2016/0128261 A1 | | 5/2016 | Figger |
| 2020/0130438 A1 | * | 4/2020 | Town ...................... B60D 1/04 |

FOREIGN PATENT DOCUMENTS

| | | |
|---|---|---|
| DE | 7733861 U1 | 5/1985 |
| DE | 102021113462 A1 | 12/2022 |
| EP | 0409796 A1 | 1/1991 |
| EP | 1111984 B1 | 6/2004 |
| WO | WO 2000010376 A1 | 3/2000 |
| WO | WO 2005089528 A1 | 9/2005 |
| WO | WO 2022248186 A1 | 12/2022 |

* cited by examiner

DRAFT LINK FOR A THREE-POINT HITCH

FIELD OF THE DISCLOSURE

The present disclosure relates to a draft link for a three-point hitch.

BACKGROUND

Agricultural and industrial work machines may include a three-point hitch for attaching various implements to the work machine. The three-point hitch, and any attached implement, may be raised and lowered. The three-point hitch can include a pair of lower draft links and an upper link.

SUMMARY

According to an aspect of the present disclosure, a draft link for a three-point hitch includes a longitudinal component, a first attachment end, a second attachment end, and a connector positioned on the second attachment end. The connector includes a first pin positioned within a first aperture of the connector and a second pin positioned within a second aperture of the connector. A first end of the first pin extends through an inner surface of the connector. A second end of the first pin extends through an outer surface of the connector. A first end and a second end of the second pin extend through an outer surface of the connector. The first pin forms an extension of an inner surface of the connector. The second pin is in contact with the first pin maintaining the position of the first pin.

According to an aspect of the present disclosure, a first end of the first pin forms the extension of the inner surface of the connector, and a first end of the second pin is positioned within an indentation in a second end of the first pin.

According to an aspect of the present disclosure, the first pin has an engaged position forming the extension of the inner surface of the connector and a disengaged position spaced apart from the inner surface.

According to an aspect of the present disclosure, the second pin has an engaged position in contact with the first pin and a disengaged position spaced apart from the first pin.

According to an aspect of the present disclosure, when the second pin is in an engaged position, the second pin maintains the first pin in an engaged position.

According to an aspect of the present disclosure, when the second pin is in a disengaged position, the first pin can move between an engaged position and a disengaged position.

According to an aspect of the present disclosure, the first pin is biased in an engaged position by a first spring.

According to an aspect of the present disclosure, the second pin is biased in an engaged position by a second spring.

According to an aspect of the present disclosure, the connector is an open position when the first pin and the second pin are both in the disengaged positions, and the connector can attach and detach to a shaft in the open position.

According to an aspect of the present disclosure, the connector is a closed position when the first pin and the second pin are both in the engaged positions, and the connector maintains a shaft within a boundary of the inner surface of the connector in the closed position.

The above and other features will become apparent from the following detailed description and accompanying drawings.

BRIEF DESCRIPTION OF THE DRAWINGS

The detailed description refers to the accompanying figures in which.

Like reference numerals are used to indicate like elements throughout the several figures.

DETAILED DESCRIPTION

The embodiments or implementations disclosed in the above drawings and the following detailed description are not intended to be exhaustive or to limit the present disclosure to these embodiments or implementations.

Figure 1:
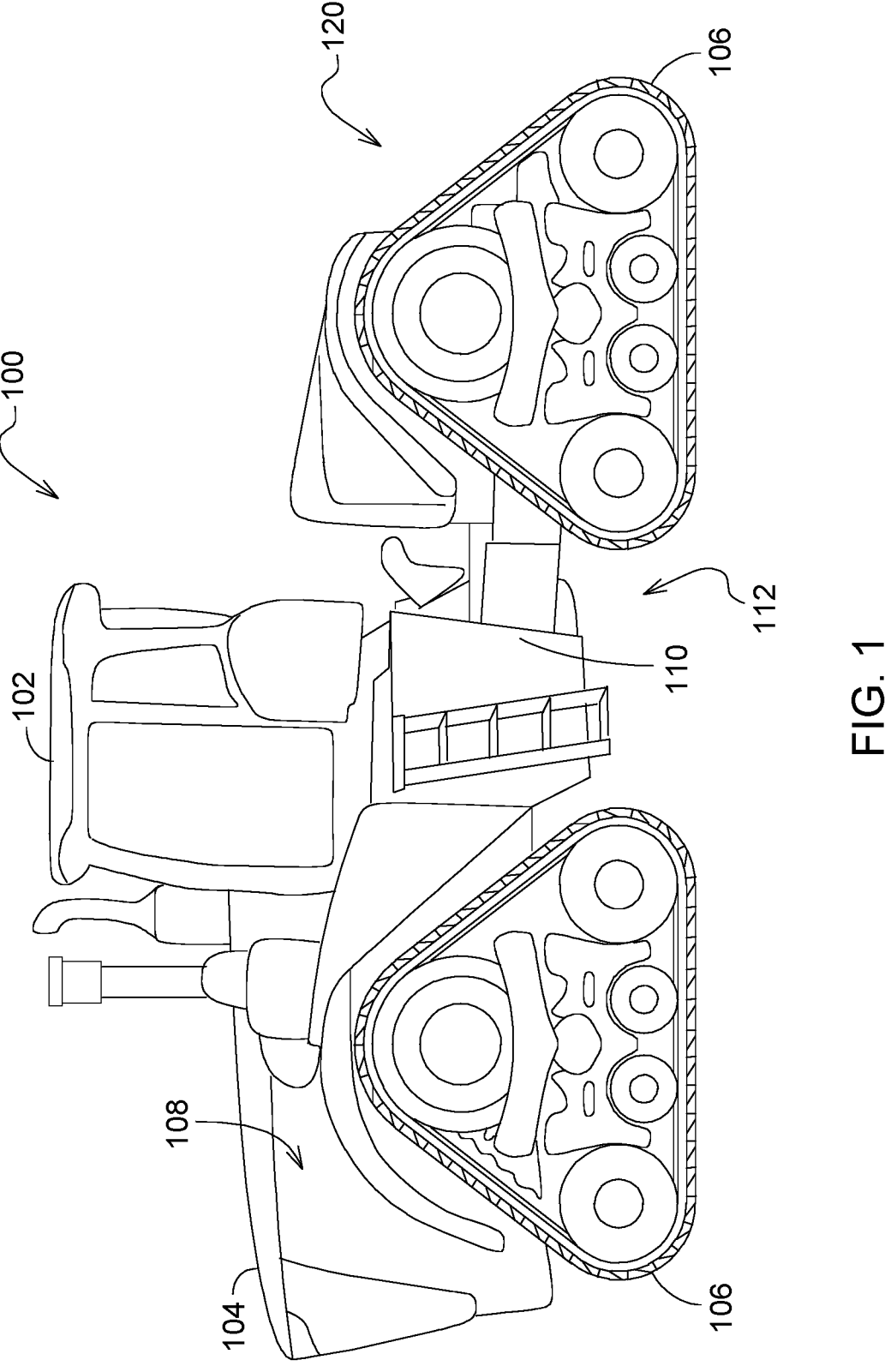
FIG. 1 is a perspective view of a work vehicle, according to an implementation.

With reference to FIG. 1, a work vehicle 100, for example an agricultural tractor, can include an operator station or cab 102, a hood 104, one or more ground engaging apparatus 106, for example wheels or track assemblies, and a frame or chassis 110. The work vehicle 100 can include an operator interface having any number and combination of electronic devices, such as an interactive display. The work vehicle 100 can have a rigid or an articulated frame 110. The work vehicle 100 can include one or more power sources 108, for example an internal combustion engine, a hybrid engine, or an electric or hydraulic machine. The work vehicle 100 can include a transmission 112 transferring power from the one or more power sources 108 to a drivetrain, which includes the ground engaging apparatus 106 and one or more power take off (PTO) shafts or other auxiliary power outputs or inputs. The work vehicle 100 can include a three-point hitch 120 at the front of the work vehicle 100, the rear of the work vehicle 100, or both. This disclosure also applies to other types of work vehicles in agriculture, construction, forestry, and road building.

Figure 2:
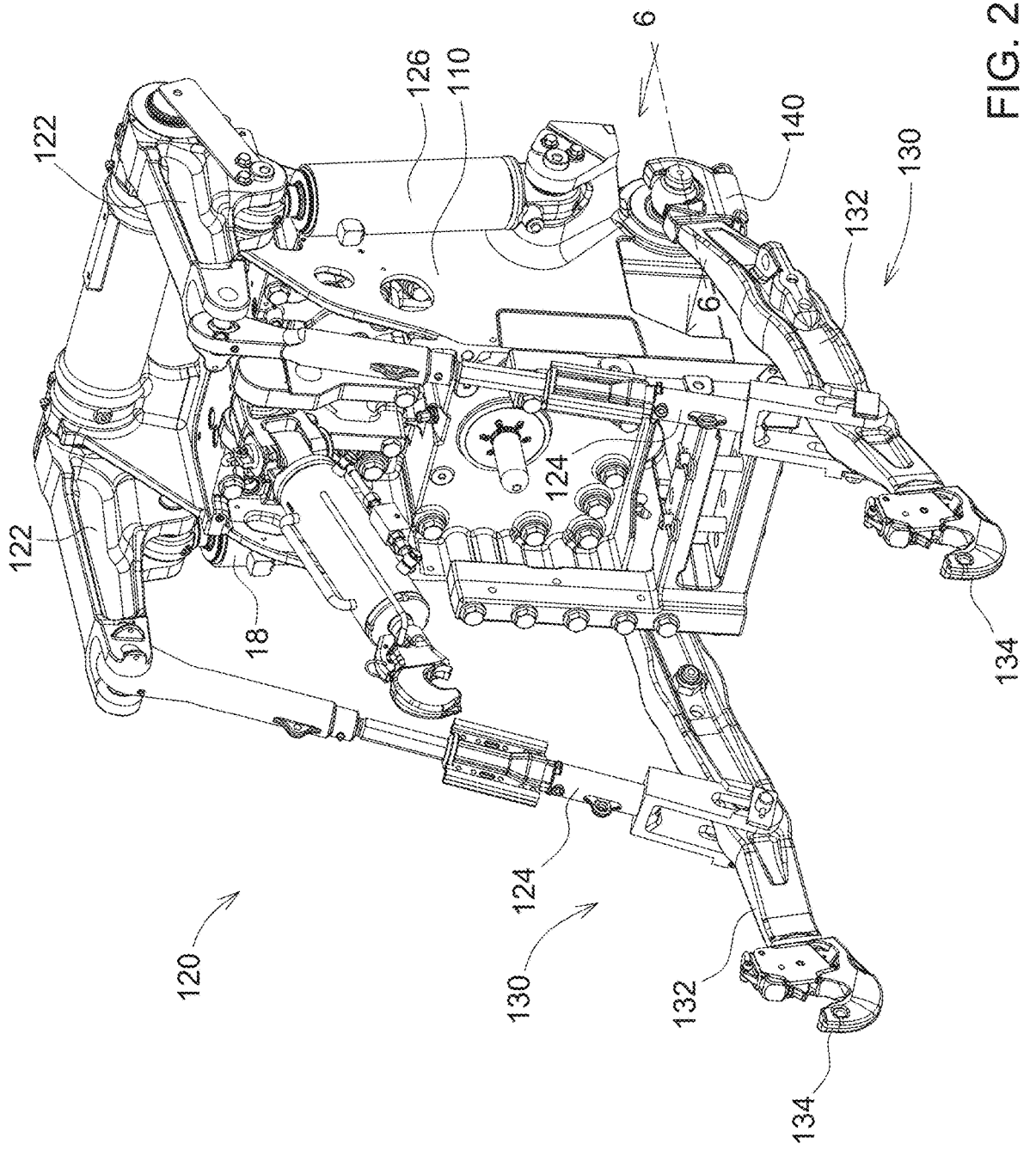
FIG. 2 is a perspective view of a three-point hitch, according to an implementation.
Figure 3:
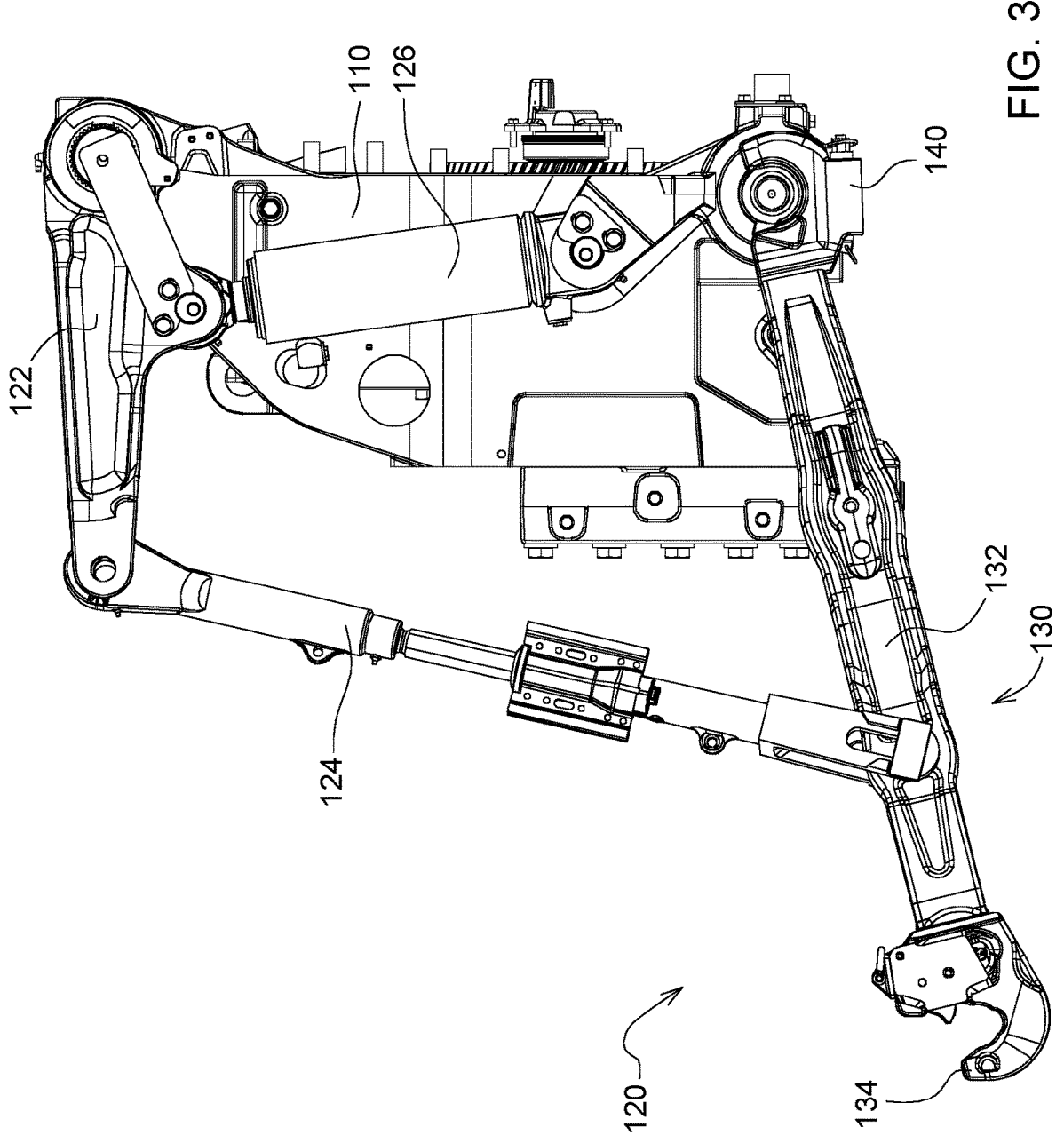
FIG. 3 is a perspective side view of a three-point hitch, according to an implementation.
Figures 4, 5, 6:
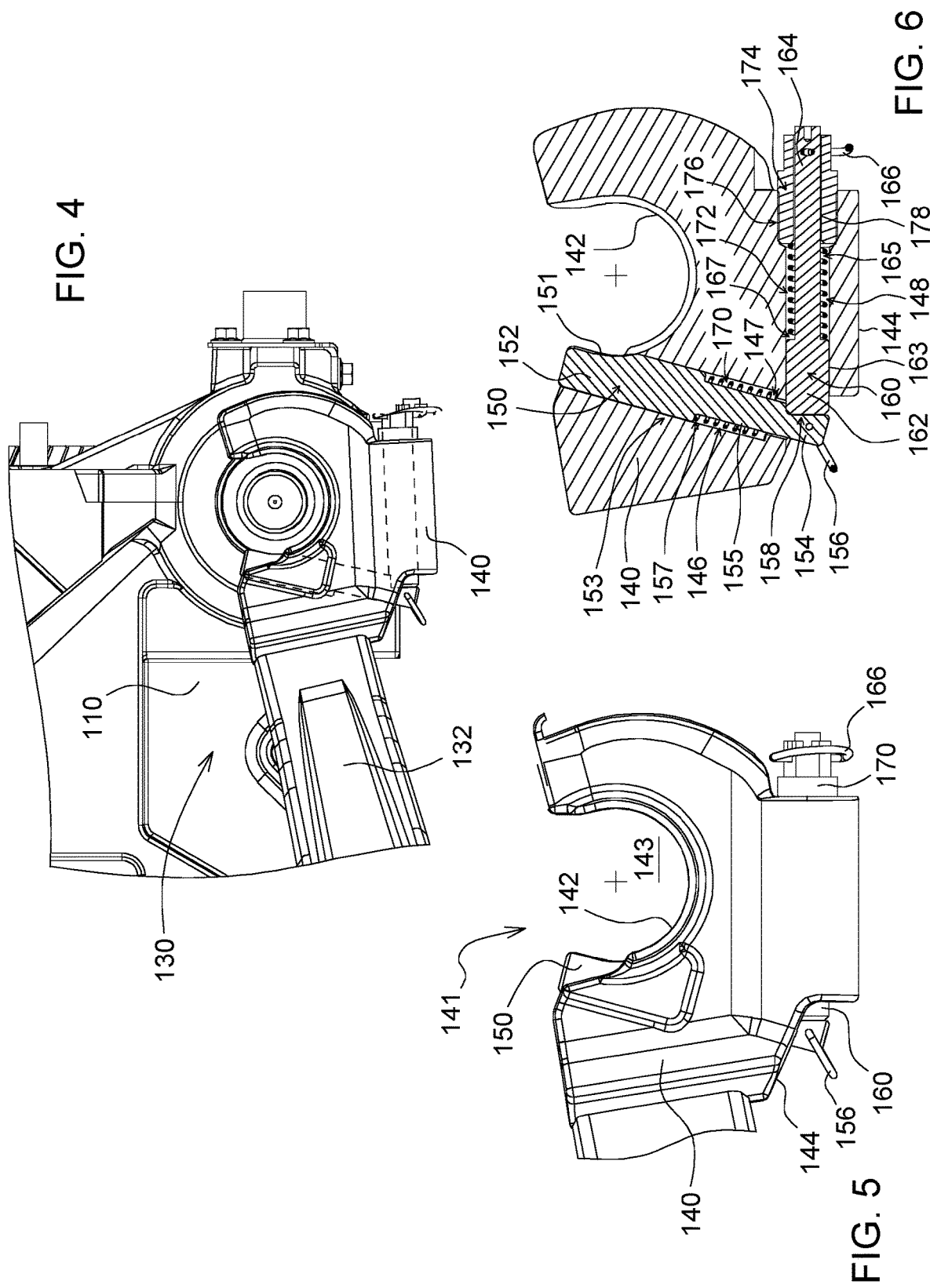
FIG. 4 is a perspective side view of a draft link, according to an implementation.
FIG. 5 is a perspective side view of a connector for a draft link, according to an implementation.
FIG. 6 is a cross-sectional view of a connector for a draft link, according to an implementation.
Figures 7, 8:
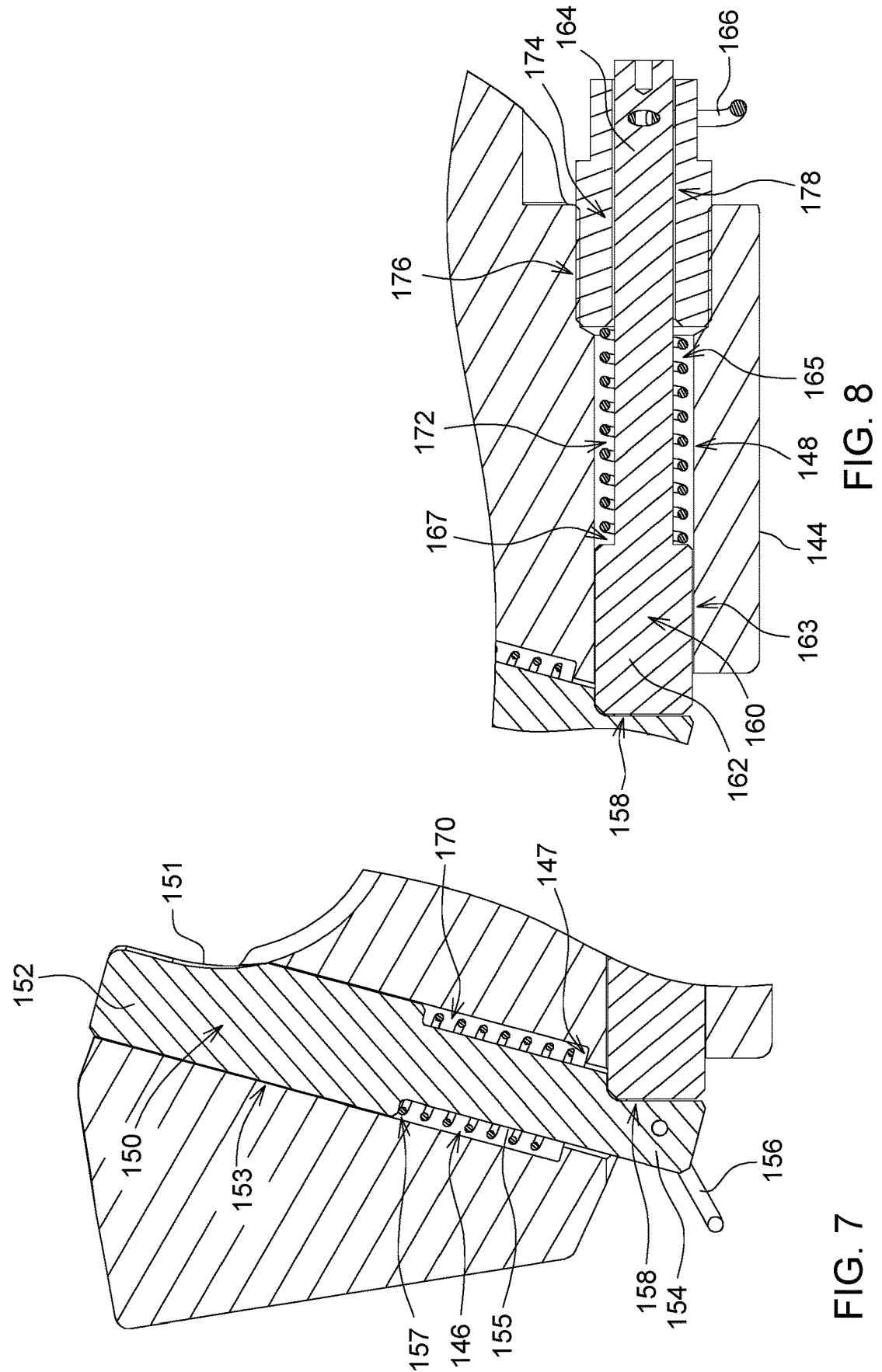
FIG. 7 is a partial cross-sectional view of a connector for a draft link, according to an implementation.
FIG. 8 is a partial cross-sectional view of a connector for a draft link, according to an implementation.
Figures 9, 10:
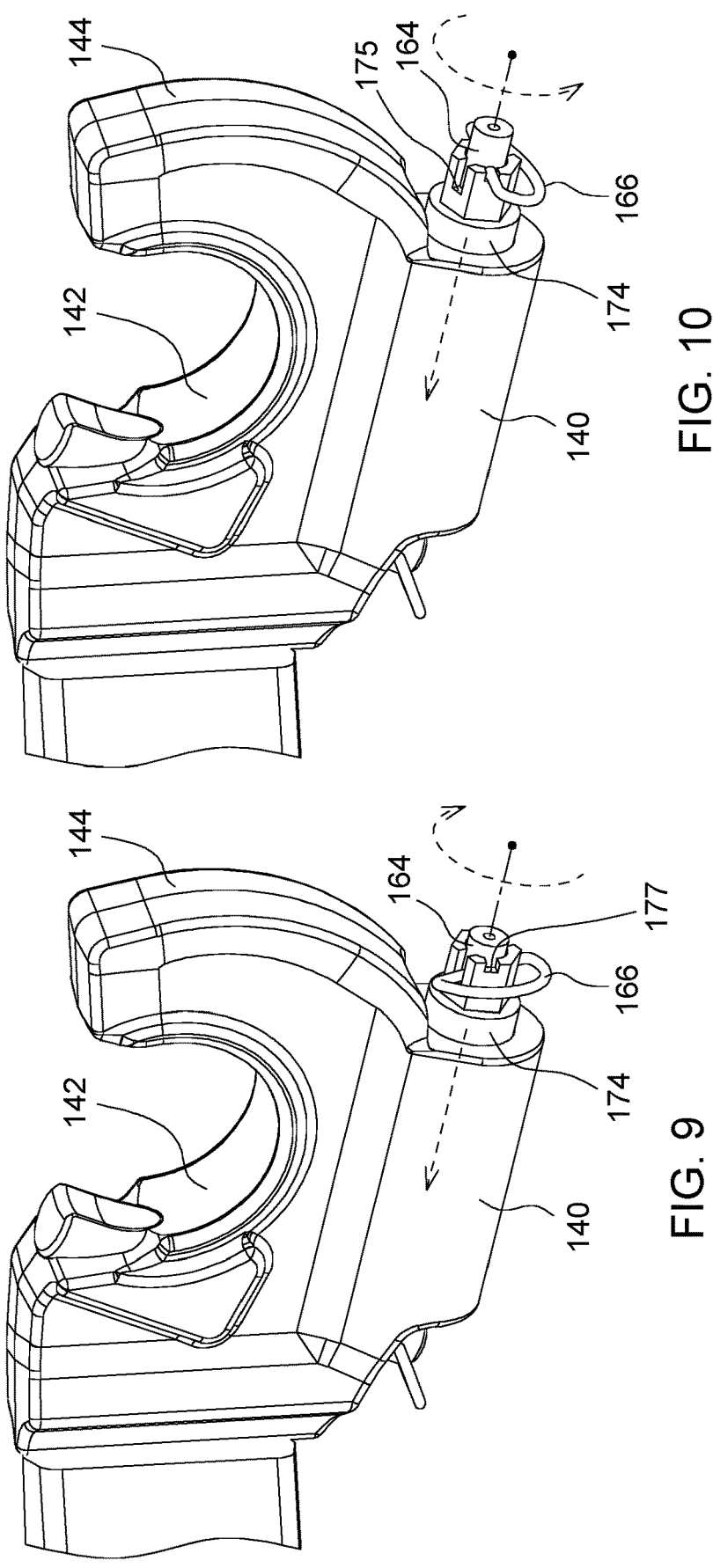
FIG. 9 is a perspective side view of a connector for a draft link, according to an implementation.
FIG. 10 is a perspective side view of a connector for a draft link, according to an implementation.
Figure 11:
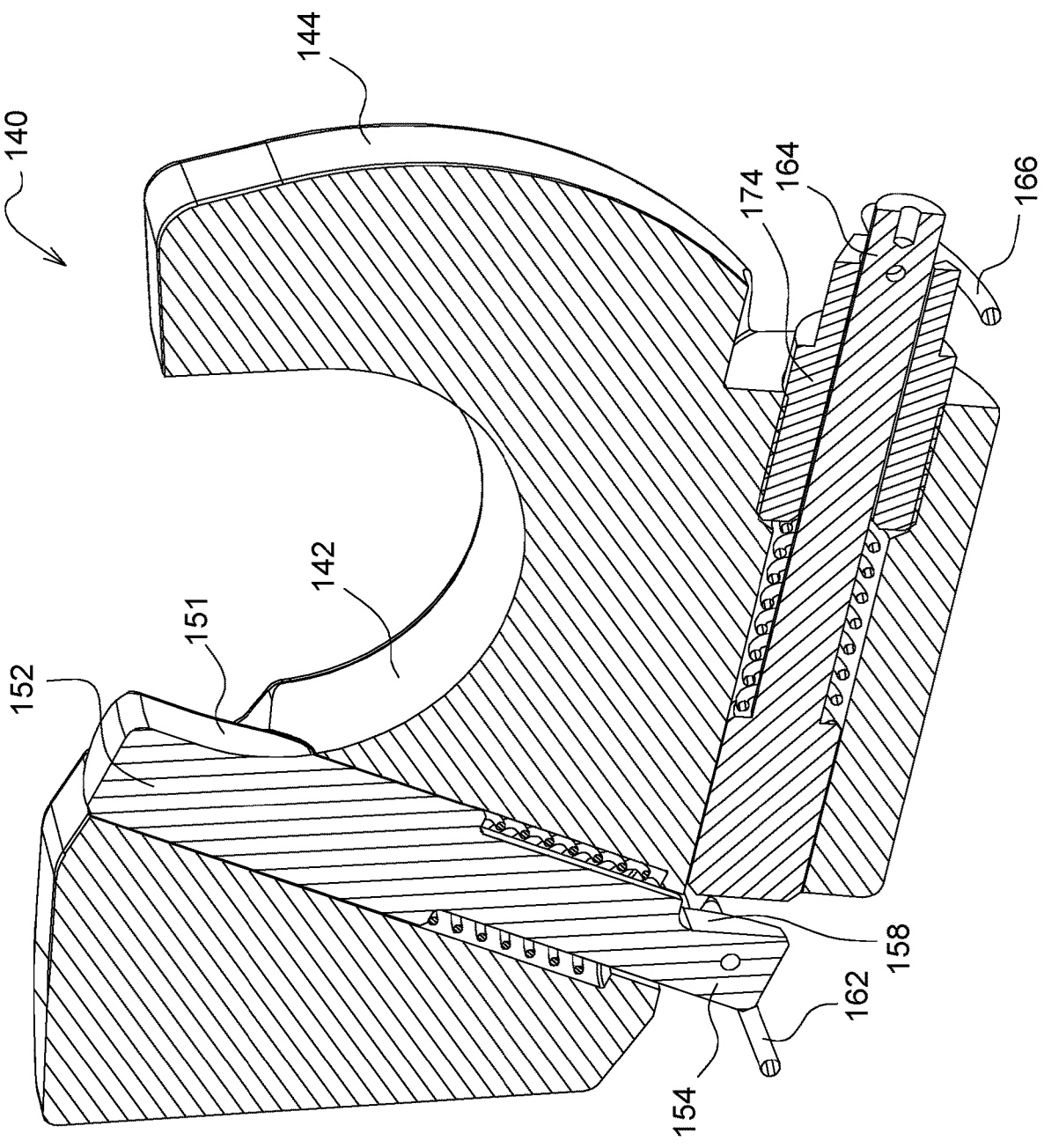
FIG. 11 is a cross-sectional view of a connector for a draft link, according to an implementation.

With reference to FIGS. 2-3, a three-point hitch 120 can include one or more rocker or lift arms 122, one or more lift links or lift link assemblies 124, one or more lift cylinders 126, and one or more draft links 130. The three-point hitch 120 can include right and left rocker or lift arms 122, right and left lift links or lift link assemblies 124, right and left lift cylinders 126, and right and left draft links 130. Each lift arm 122 is coupled to the frame 110 and to a lift link assembly 124. Each lift cylinder 126 is coupled to the frame 110 and to a lift arm 122. Each draft link 130 is coupled to the frame 110 and to a lift link assembly 124. Any or all of the couplings can be rotationally or pivotally coupled or otherwise connected. Each draft link 130 can include a longitudinal member or component 132 (e.g., a rod, a bar, a tube, etc.), a connector 134 at or near a first attachment end, and a connector 140 at or near a second attachment end. The connector 134 can include a ball, pin, or hook type connector. The connector 134 can connect to an implement or other equipment.

With reference to FIGS. 4-11, the connector 140 can rotatably or pivotally couple to frame 110. The connector 140 can have a semi-circular shape or U-shape. The connector 140 forms a partial enclosure or circle having an opening 141 on one side and an opening 143 in the interior. The connector 140 can include an inner surface 142, an outer surface 144, a first aperture 146, and a second aperture 148. The inner surface 142 defines the boundary of the opening 143 in the interior. The inner surface 142 of the connector 140 can form half or less than half of an enclosure or circle. The first aperture 146 extends through the connector 140 with one end of the first aperture 146 in the outer surface 144 and the other end of the aperture 146 in the inner surface 142. The first aperture 146 can have a larger opening in the inner surface 142 than the opening in the outer surface 144. The difference or transition between the size of the openings in the inner and outer surfaces 142, 144 creates a step or ledge 147. The second aperture 148 extends through the connector 140 with both ends or openings of the second aperture 148 in the outer surface 144.

A first pin 150 can be positioned in the first aperture 146. The first pin 150 can extend through the first aperture 146 with a first end 152 extending inwardly and a second end 154 extending outwardly. The first end 152 of the first pin 150 extends beyond or through the inner surface 142 of the connector 140. The first end 152 of the first pin 150 forms an additional contact surface in coordination with the inner surface 142 of the connector 140. The first end 152 of the first pin 150 can form an extension of the inner surface 142 of the connector 140. The arrangement of the inner surface 142 of the connector 140 and the first end 152 of the first pin 150 can maintain a shaft or rod within the opening 143 of the connector 140. The first pin 150 can include a curved or concave portion 151, which corresponds to the curvature of the inner surface 142 of the connector 140. The combination of the inner surface 142 of the connector 140 and the concave portion 151 of the first pin 150 can form more than half an enclosure or circle.

The second end 154 of the first pin 150 extends beyond or through the outer surface 144 of the connector 140. The second end 154 of the first pin 150 can include an indentation 158. The second end 154 can include a retaining pin 156 to maintain the position of the second end 154 at least partially outside of the first aperture 146.

The first pin 150 can include a first circumference 153 near the first end 152 and a second circumference 155 near the second end 154, between the first and second ends 152, 154, or both. The first circumference 153 is larger than the second circumference 155. The difference or transition between the first and second circumferences 153, 155 creates a step or ledge 157.

A first spring 170 can be positioned around the second circumference of the first pin 150 between the first and second ends 152, 154. One end of the first spring 170 can contact the connector 140 at the ledge or shelf 147 and the other end can contact the first pin 150 at the transition between the first and second circumferences 153, 155. The first spring 170 can bias the first pin 150 towards the inner surface 142 of the connector 140 so that the concave portion 151 of the first pin 150 corresponds to the inner surface 142 in an engaged position. The first spring 170 can be compressed between the ledge 157 of the first pin 150 and the ledge 147 of the first aperture 146 so that the concave portion 151 of the first pin 150 moves away from the inner surface 142 in a disengaged position.

A second pin 160 can be positioned in the second aperture 148. The second pin 160 can extend through the second aperture 148 with both a first end 162 and a second end 164 extending beyond or through an outer surface 144 of the connector 140. The first end 162 of the second pin 160 can extend into the indentation 158 of the first pin 150 to maintain the position of the first pin 150 in the first aperture 146. The second end 164 of the second pin 160 can include a retaining pin 166 to maintain the position of the second end 164 at least partially outside of the second aperture 148.

The second pin 160 can include a first circumference 163 near the first end 162 and a second circumference 165 near the second end 164, between the first and second ends 162, 164, or both. The first circumference 163 is larger than the second circumference 165. The difference or transition between the first and second circumferences 163, 165 creates a step or ledge 167.

A fastener 174 can include external threads 176 to couple with threads in the second aperture 148. Alternatively, the fastener 174 can utilize an interference fit to fasten into the second aperture 148. The fastener 174 can include an interior aperture 178 for the pin 160 to move or slide into or through. The fastener 174 can include a first slot 175 and a second slot 177. The first slot 175 is larger than the second slot 177. When the second pin 160 is in the engaged position, the retaining pin 166 is positioned in the first slot 175. When the second pin is in the disengaged position, the retaining pin 166 is removed from the first slot 175. The second pin 160 can then be rotated and the retaining pin 166 can be positioned in the second slot 177, which maintains the second pin 160 in the disengaged position. To move the second pin 160 to the engaged position, the retaining pin 166 is removed from the second slot 177 and the second pin 160 is rotated so that the retaining pin 166 can be positioned in the first slot 175.

A second spring 172 can be positioned around the second circumference 165 of the second pin 160 between the first and second ends 162, 164. One end of the second spring 172 can contact the fastener 174 and the other end can contact the second pin 160 at the transition between the first and second circumferences 163, 165. The second spring 172 can bias the second pin 160 into engagement with the first pin 150. The second spring 172 can bias the second end 162 of the second pin 160 into the indentation 158 of the first pin 150 in an engaged position. The second spring 172 can be compressed between the ledge 167 of the second aperture 148 and the fastener 174 so that the second pin 160 moves away from the first pin 150 in a disengaged position, as shown for example in FIG. 11.

To connect the draft link 130 to a work vehicle 100, the second pin 160 is moved into the disengaged position spaced apart from the first pin 150, and then the first pin 150 is moved into the disengaged position spaced apart from the inner surface 142 of the connector 140. The second pin 160 is moved away from the first pin 150 against the force of the second spring 172, which removes the second pin 160 from the indentation 158 in the first pin 150. An external force can act on the retaining pin 166 to move the second pin 160 away from the first pin 150. This allows the first pin 150 to be moved away from the inner surface 142 of the connector 140 against the force of the first spring 170. An external force can act on the retaining pin 156 to move the first pin 150 away from the inner surface 142. When both the first and second pins 150, 160 are in the disengaged positions, the connector is in an open position and can be attached to a shaft or rod on the work vehicle 100.

After attaching the connector 140, the first pin 150 is released and moves towards the inner surface 142 of the connector 140 with the force of the first spring 170 to the engaged position. The second pin 160 is released and moves towards the first pin 150 with the force of the second spring 172 to the engaged position. When both the first and second pins 150, 160 are in the engaged positions, the connector 140 is in a closed position and maintains the shaft or rod within a boundary of the inner surface 142 of the connector 140.

To disconnect the draft link 130 to a work vehicle 100, the second pin 160 is moved into the disengaged position and then the first pin 150 is moved into the disengaged position. When both the first and second pins 150, 160 are in the disengaged positions, the connector is in an open position and can be detached from a shaft or rod on the work vehicle 100.

The terminology used herein is for the purpose of describing example embodiments or implementations and is not intended to be limiting of the disclosure. As used herein, the singular forms "a," "an." and "the" are intended to include the plural forms as well, unless the context clearly indicates otherwise. It will be further understood that the any use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof.

Those having ordinary skill in the art will recognize that terms such as "above," "below," "upward," "downward," "top," "bottom," etc., are used descriptively for the figures, and do not represent limitations on the scope of the present disclosure, as defined by the appended claims. Furthermore, the teachings may be described herein in terms of functional and/or logical block components or various processing steps, which may include any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described embodiments or implementations.

As used herein, "e.g.," is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example embodiments or implementations of the present disclosure, these descriptions should not be viewed in a restrictive or limiting sense. Rather, there are several variations and modifications which may be made without departing from the scope of the appended claims.

What is claimed is:

1. A draft link for a three-point hitch, comprising:
a longitudinal component;
a first attachment end;
a second attachment end; and
a connector positioned on the second attachment end, the connector including a first pin positioned within a first aperture of the connector and a second pin positioned within a second aperture of the connector, a first end of the first pin extends through an inner surface of the connector, a second end of the first pin extends through an outer surface of the connector, a first end and a second end of the second pin extend through the outer surface of the connector, the first pin forming an extension of the inner surface of the connector, and wherein at a lowermost end of the connector, the first end of the second pin is in contact with the second end of the first pin maintaining the position of the first pin, and the second pin is oriented in a substantially horizontal position.

2. The draft link of claim 1, wherein the first end of the first pin forms the extension of the inner surface of the connector, and the first end of the second pin is positioned within an indentation in the second end of the first pin.

3. The draft link of claim 1, wherein the first pin has an engaged position forming the extension of the inner surface of the connector and a disengaged position spaced apart from the inner surface.

4. The draft link of claim 1, wherein the second pin has an engaged position in contact with the first pin and a disengaged position spaced apart from the first pin.

5. The draft link of claim 1, wherein when the second pin is in an engaged position, the second pin maintains the first pin in an engaged position.

6. The draft link of claim 1, wherein when the second pin is in a disengaged position, the first pin can move between an engaged position and a disengaged position.

7. The draft link of claim 1, wherein the first pin is biased in an engaged position by a first spring.

8. The draft link of claim 7, wherein the second pin is biased in an engaged position by a second spring.

9. The draft link of claim 1, wherein the connector is an open position when the first pin and the second pin are both in disengaged positions, and the connector can attach and detach to a shaft in the open position.

10. The draft link of claim 1, wherein the connector is a closed position when the first pin and the second pin are both in engaged positions, and the connector maintains a shaft within a boundary of the inner surface of the connector in the closed position.

11. A three-point hitch including a draft link, comprising:
a longitudinal component;
a first attachment end;
a second attachment end; and
a connector positioned on the second attachment end, the connector including a first pin positioned within a first aperture of the connector and a second pin positioned within a second aperture of the connector, a first end of the first pin extends through an inner surface of the connector, a second end of the first pin extends through an outer surface of the connector, a first end and a second end of the second pin extend through the outer surface of the connector, the first pin forming an extension of the inner surface of the connector, and wherein at a lowermost end of the connector, the first end of the second pin is in contact with the second end of the first pin maintaining the position of the first pin, and the second pin is oriented in a substantially horizontal position.

12. The three-point hitch of claim 11, wherein the first end of the first pin forms the extension of the inner surface of the connector, and the first end of the second pin is positioned within an indentation in the second end of the first pin.

13. The three-point hitch of claim 11, wherein the first pin has an engaged position forming the extension of the inner surface of the connector and a disengaged position spaced apart from the inner surface.

14. The three-point hitch of claim 11, wherein the second pin has an engaged position in contact with the first pin and a disengaged position spaced apart from the first pin.

15. The three-point hitch of claim 11, wherein when the second pin is in an engaged position, the second pin maintains the first pin in an engaged position.

16. The three-point hitch of claim 11, wherein when the second pin is in a disengaged position, the first pin can move between an engaged position and a disengaged position.

17. The three-point hitch of claim 11, wherein the first pin is biased in an engaged position by a first spring.

18. The three-point hitch of claim 17, wherein the second pin is biased in an engaged position by a second spring.

19. The three-point hitch of claim 11, wherein the connector is an open position when the first pin and the second pin are both in disengaged positions, and the connector can attach and detach to a shaft in the open position.

20. The three-point hitch of claim 11, wherein the connector is a closed position when the first pin and the second pin are both in engaged positions, and the connector maintains a shaft within a boundary of the inner surface of the connector in the closed position.

* * * * *